(12) United States Patent
Lo

(10) Patent No.: US 9,928,117 B2
(45) Date of Patent: Mar. 27, 2018

(54) HARDWARE ACCESS COUNTERS AND EVENT GENERATION FOR COORDINATING MULTITHREADED PROCESSING

(71) Applicant: Vivante Corporation, Santa Clara, CA (US)

(72) Inventor: Mankit Lo, Fremont, CA (US)

(73) Assignee: Vivante Corporation, San Jose, CA (US)

( * ) Notice: Subject to any disclaimer, the term of this patent is extended or adjusted under 35 U.S.C. 154(b) by 129 days.

(21) Appl. No.: 14/966,867

(22) Filed: Dec. 11, 2015

(65) Prior Publication Data
US 2017/0168875 A1    Jun. 15, 2017

(51) Int. Cl.
*G06F 9/46*    (2006.01)
*G06F 9/52*    (2006.01)
*G06F 9/30*    (2018.01)

(52) U.S. Cl.
CPC .................. *G06F 9/52* (2013.01); *G06F 9/30* (2013.01); *G06F 2209/521* (2013.01); *G06F 2209/522* (2013.01)

(58) Field of Classification Search
None
See application file for complete search history.

(56) References Cited

U.S. PATENT DOCUMENTS

| | | |
|---|---|---|
| 4,531,826 A | 7/1985 | Stoughton |
| 5,430,850 A | 7/1995 | Papadopoulos |
| 5,901,302 A * | 5/1999 | Witt ..................... G06F 9/30036 711/E12.075 |
| 6,263,410 B1 | 7/2001 | Kao et al. |
| 7,543,136 B1 | 6/2009 | Coon |
| 7,782,995 B2 | 8/2010 | Gara |
| 7,788,468 B1 | 8/2010 | Nickolls |
| 8,108,659 B1 | 1/2012 | Le Grand |
| 8,345,816 B1 | 1/2013 | Adiga |
| 8,381,203 B1 | 2/2013 | Beylin |
| 2005/0138639 A1* | 6/2005 | Hagan ....................... G06F 9/52 719/318 |
| 2005/0149697 A1* | 7/2005 | Enright ................. G06F 9/3009 712/214 |
| 2008/0294882 A1 | 11/2008 | Jayapala |
| 2008/0301409 A1 | 12/2008 | May |
| 2010/0299487 A1 | 11/2010 | Hooper |
| 2012/0096474 A1 | 4/2012 | Jiao |
| 2012/0226868 A1 | 6/2012 | Ceze et al. |

(Continued)

*Primary Examiner* — Kenneth Tang
(74) *Attorney, Agent, or Firm* — Stevens Law Group; David R. Stevens

(57) ABSTRACT

A computer system includes a hardware synchronization component (HSC). Multiple concurrent threads of execution issue instructions to update the state of the HSC. Multiple threads may update the state in the same clock cycle and a thread does not need to receive control of the HSC prior to updating its states. Instructions referencing the state received during the same clock cycle are aggregated and the state is updated according to the number of the instructions. The state is evaluated with respect to a threshold condition. If it is met, then the HSC outputs an event to a processor. The processor then identifies a thread impacted by the event and takes a predetermined action based on the event (e.g. blocking, branching, unblocking of the thread).

20 Claims, 4 Drawing Sheets

(56) References Cited

U.S. PATENT DOCUMENTS

2013/0198419 A1      8/2013  Jones
2013/0326524 A1     12/2013  Houston
2014/0075165 A1      3/2014  Chen
2014/0082625 A1      3/2014  Busaba et al.
2014/0380020 A1*    12/2014  Gray ........................ G06F 9/52
                                                          712/203

* cited by examiner

US 9,928,117 B2

HARDWARE ACCESS COUNTERS AND EVENT GENERATION FOR COORDINATING MULTITHREADED PROCESSING

BACKGROUND

Field of the Invention

This invention relates to systems and methods for coordinating actions among multiple concurrently executing threads.

Background of the Invention

In conventional computer systems, multiple threads of execution may be executed in order to take best advantage of processing resources. However, in many applications, coordination among separate threads of execution is needed. This is readily performed for small number of threads by generating events within threads that are shared with other threads, which then take appropriate action based on the events. This approach, however, results in delays and high processing overhead.

The systems and methods described herein provide an improved approach for coordinating between threads.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
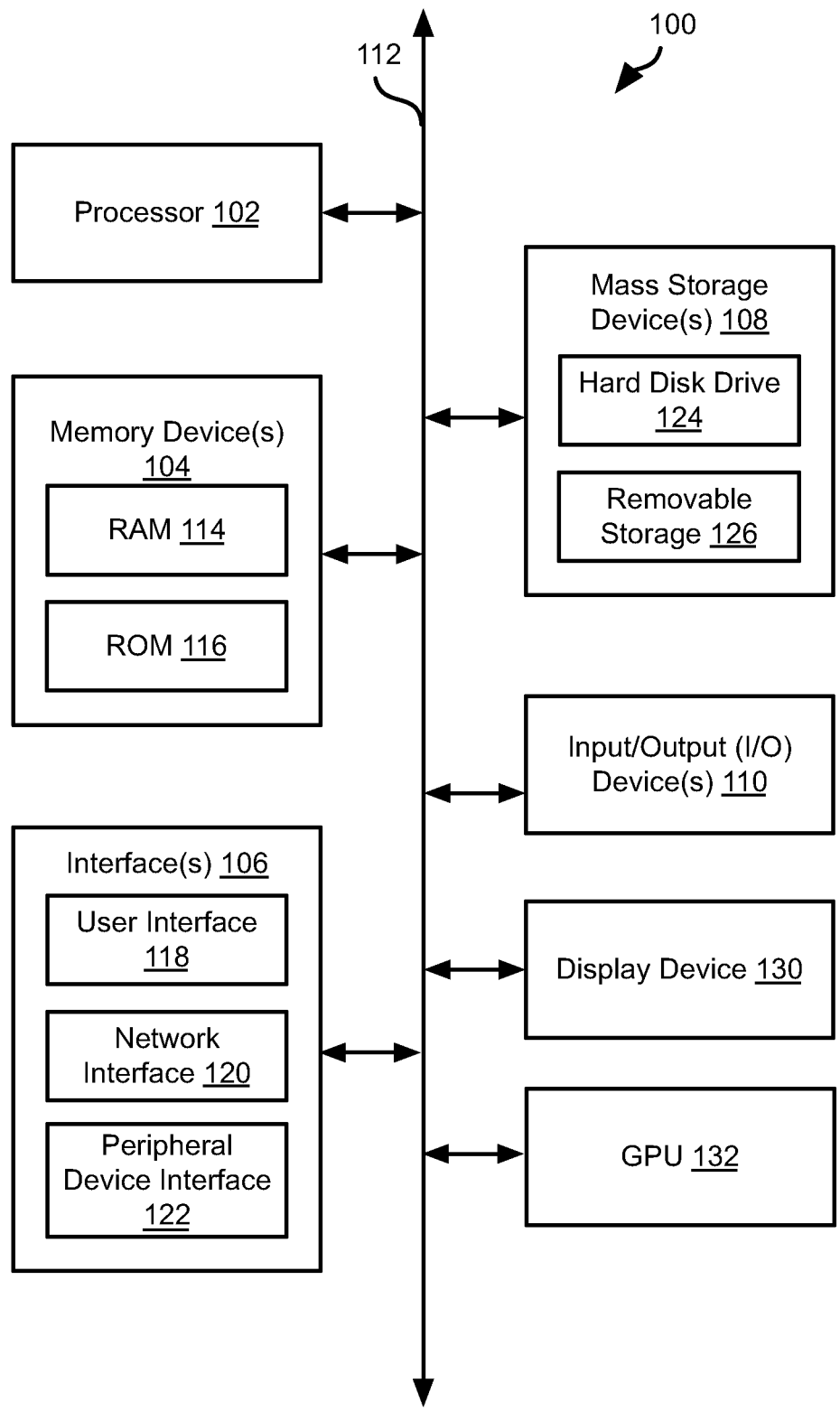
FIG. 1 is a schematic block diagram of a computer system suitable for implementing methods in accordance with embodiments of the invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized, including non-transitory media. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 is a block diagram illustrating an example computing device 100. Computing device 100 may be used to perform various procedures, such as those discussed herein. Computing device 100 can function as a server, a client, or any other computing entity. Computing device can perform various monitoring functions as discussed herein, and can execute one or more application programs, such as the application programs described herein. Computing device 100 can be any of a wide variety of computing devices, such as a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer-readable media, such as cache memory.

Memory device(s) 104 include various computer-readable media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer readable media, such as magnetic tapes, magnetic disks, optical disks, solid-state memory (e.g., Flash memory), and so forth. As shown in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, microphones, monitors or other display devices, speakers, printers, network interface cards, modems, lenses, CCDs or other image capture devices, and the like.

Display device 130 includes any type of device capable of displaying information to one or more users of computing device 100. Examples of display device 130 include a monitor, display terminal, video projection device, and the like.

A graphics-processing unit (GPU) 132 may be coupled to the processor(s) 102 and/or to the display device 130. The GPU may be operable to render computer generated images and perform other graphical processing. The GPU may include some or all of the functionality of a general-purpose processor, such as the processor(s) 102. The GPU may also include additional functionality specific to graphics processing. The GPU may include hard-coded and/or hard-wired graphics function related to coordinate transformation, shading, texturing, rasterization, and other functions helpful in rendering a computer generated image.

Interface(s) 106 include various interfaces that allow computing device 100 to interact with other systems, devices, or computing environments. Example interface(s) 106 include any number of different network interfaces 120, such as interfaces to local area networks (LANs), wide area networks (WANs), wireless networks, and the Internet. Other interface(s) include user interface 118 and peripheral device interface 122. The interface(s) 106 may also include one or more user interface elements 118. The interface(s) 106 may also include one or more peripheral interfaces such as interfaces for printers, pointing devices (mice, track pad, etc.), keyboards, and the like.

Bus 112 allows processor(s) 102, memory device(s) 104, interface(s) 106, mass storage device(s) 108, and I/O device (s) 110 to communicate with one another, as well as other devices or components coupled to bus 112. Bus 112 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 100, and are executed by processor(s) 102. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 2:
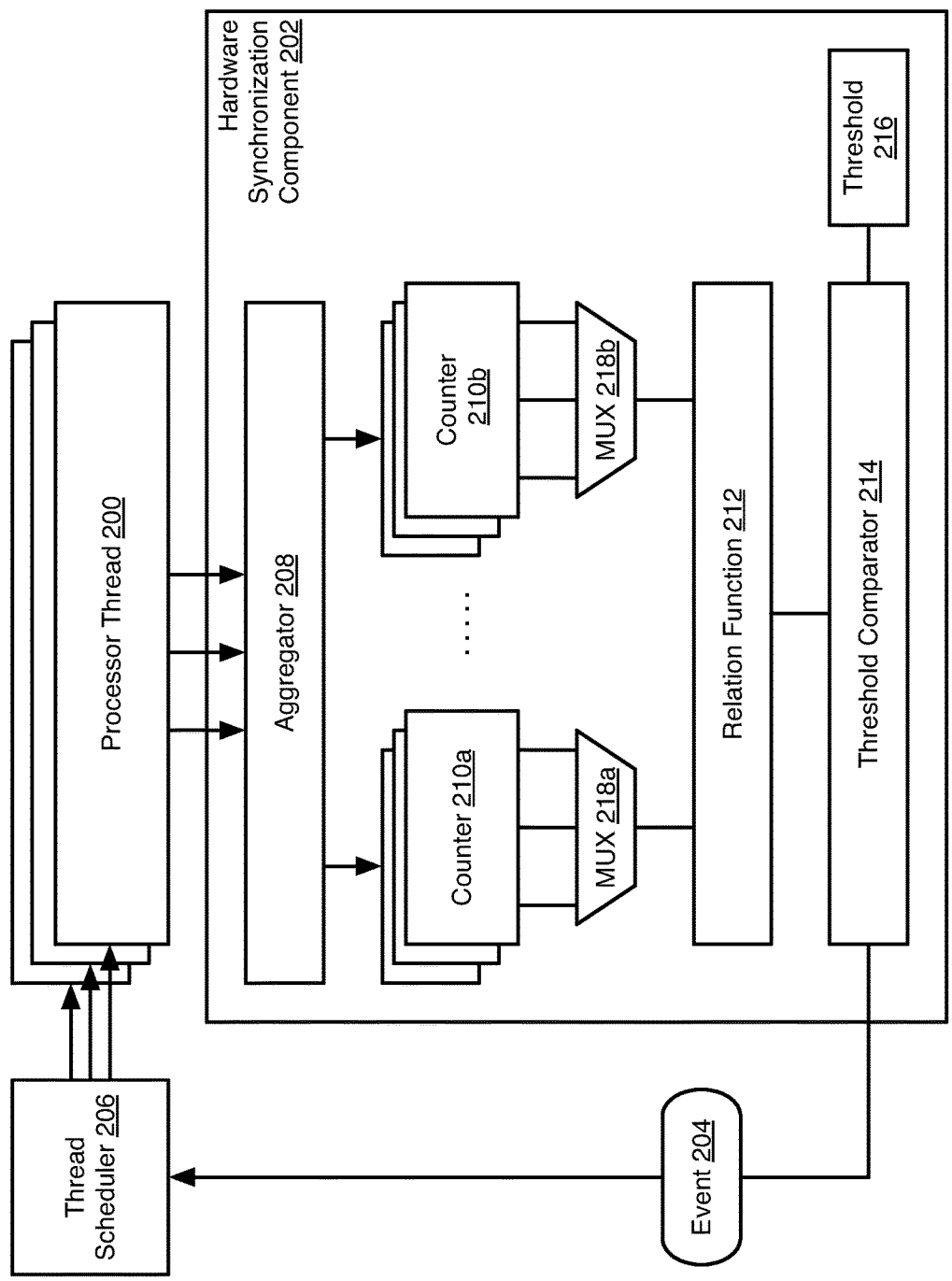
FIG. 2 is a schematic block diagram of components for implementing hardware event generation in accordance with an embodiment of the present invention.

Referring to FIG. 2, the processing device 102 may execute one or more threads 200. As noted above, the computer system 100 may include a plurality of processing devices 102. Any one of the processing devices 102 or a combination of the processing devices 102 may perform the functions ascribed hereinbelow to "the processing device" 102. The threads may be instantiated by an application executed by the processing device 102. The processor may distribute processing resources and switch execution from one thread 200 to another in the conventional manner. The threads 200 may issue instructions to a hardware synchronization component (HSC) 202. The HSC 202 receives the instructions and updates its state. Based on the state of the HSC 202, the HSC 202 may output events 204 to a thread scheduler 206. The thread scheduler 206 may then alter the execution of one or more processor threads 200. For example, the thread scheduler 206 may cause a one of the threads 200 to block, unblock, or branch in response to events 204.

The HSC 202 may include an aggregator 208. The HSC 202 may include a plurality of states, each of which may be addressed individually. Each state may include one or more values defining the state. Accordingly, the aggregator 208 may aggregate instructions referencing each value of each state received during a period, e.g. a clock cycle of the processor 102, HSC 202, a bus 112, or other component.

For each value of each state, a counter 210a-210b may be updated. In particular, each counter 210a-210b may count a number of instructions referencing an individual state and value of the state during a clock cycle.

Periodically, such as one per clock cycle, a relation function 212 may be executed for each state. The relation function 212 may produce an output value for each state. The output value is then input to a threshold comparator 214. The threshold comparator takes as another input a threshold 216. The threshold 216 may be the same for each state or one or more states may have different thresholds 216.

If the threshold comparator 214 determines that the output value satisfies a threshold condition specified by the threshold 216 for the state, then an event 204 is generated. In some embodiments, the threshold comparator 214 may maintain a record of events 204 that are generated and clear the events when the threshold condition is not met. For example, on iteration of execution of the relation function 212 and comparator 214 may result in an event 204 being generated for a state due to satisfying of the threshold condition 216. In a subsequent iteration, the output value of the relation function 212 may no longer meet the threshold condition 216. Accordingly, in response to detecting that the threshold condition 216 is no longer satisfied, an event 204 may be generated that indicates this fact.

As noted above, the HSC may implement multiple states. Accordingly, one or more MUXs 218a-218b may selectively couple the values of the counters 210a-210b of each state to the relation function 212 and comparator 214 such that the same circuits may be used to evaluate multiple states.

The illustrated components of FIG. 2 may be used to perform any type of synchronization among concurrently executing threads. As is apparent from the above description, multiple threads may update one of the states of the HSC 202 rather than each having to wait for another thread to finish updating the state of the HSC 202.

In one example, a state may implement a first-in-first-out buffer. In this example, counter 210a may count write instructions to the FIFO buffer and counter 210b may count read instructions to the FIFO buffer. The relation function 212 may subtract the value of counter 210b form the counter 210a. The comparator 214 may evaluate this difference with respect to one or more thresholds. If the difference is zero, the FIFO buffer is empty. If the difference is below a first threshold, the FIFO buffer is near empty. If the difference is equal to the size of the FIFO buffer, the FIFO buffer is full. If the difference is above a second threshold higher than the first threshold (e.g. 90% of the buffer size), the FIFO buffer is near full. Accordingly, the thresholds 216 may specify a low value indicating a near empty condition and a high value indicating a near full condition. The threshold comparator 214 may then generate some or all empty, near empty, full, and near full events based on the difference satisfying any of the above-described conditions.

In other examples, a state may include a single value and an event is generated in response to that value meeting a threshold condition (e.g. above or below a threshold value).

Figure 3:
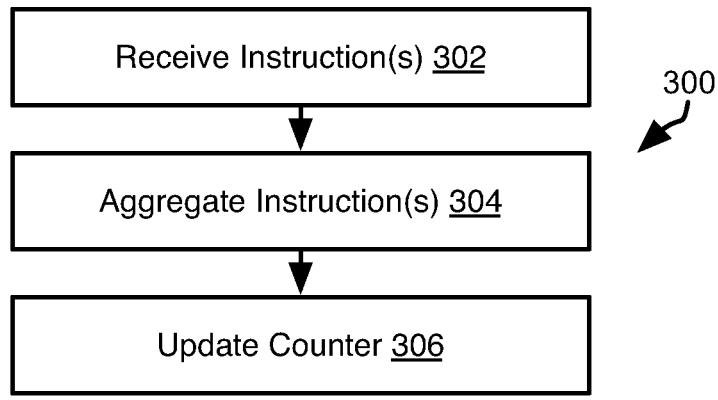
FIG. 3 is a process flow diagram of a method for updating hardware counters for event generation in accordance with an embodiment of the present invention.

Referring to FIG. 3, the illustrated method 300 may be executed by the HSC 202. The method 300 may be executed once per clock cycle as noted above. The method 300 may be executed for each value of each state of the HSC 202. The method 300 includes receiving 302 zero or more instructions during a clock cycle, aggregating (e.g. counting) 304 the number of instructions received during the cycle, and updating 306 the counter for the each value of the each state, such as by incrementing the counter by the number of instructions at step 304.

Figure 4:
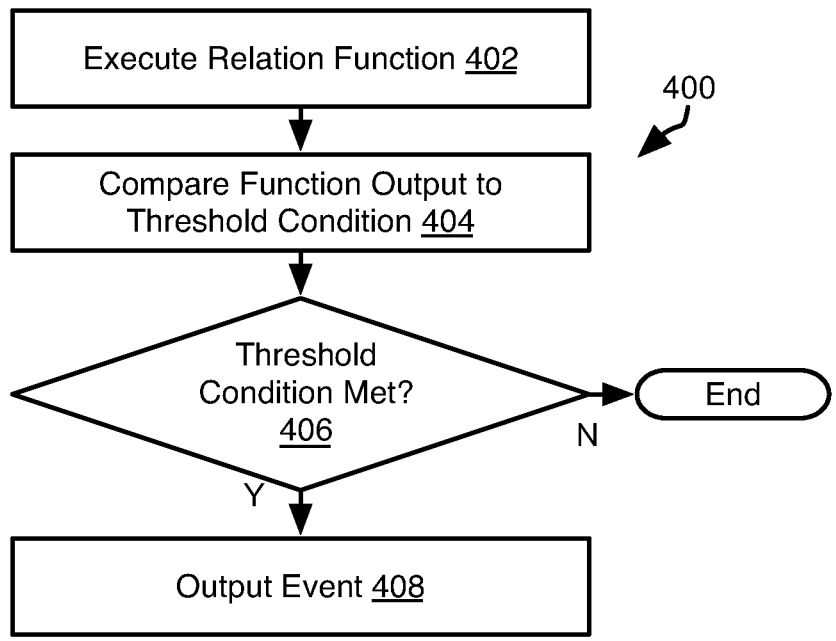
FIG. 4 is a process flow diagram of a method for generating events based on hardware counters in accordance with an embodiment of the present invention.

Referring to FIG. 4, the illustrated method 400 may be executed by the HSC 202. The method 400 may be executed once per clock cycle or every N clock cycles, where N is greater than 1. The method 400 may be executed for each state of the HSC 202. In some embodiments, the method 400 is executed for a state only if the state has changed during the clock cycle or an immediately preceding clock cycle.

The method 400 includes executing 402 a relation function with respect to the values of the state. The relation function may include subtracting the value of one counter from another, summing counter values, multiplying counter values, or inputting the counter values to any arbitrary function. The output of the relation function is then compared 404 to a threshold condition. If this condition is found 406 to be met, an event is output that indicates that the threshold condition is met. If not, then the method 400 ends. In some embodiments, multiple threshold conditions may be defined for a state. Accordingly, the event generated 408 may reference the threshold condition that is met. A threshold condition may include the output of the function value being greater than or less than a threshold value or being located within a range of threshold values.

Figure 5:
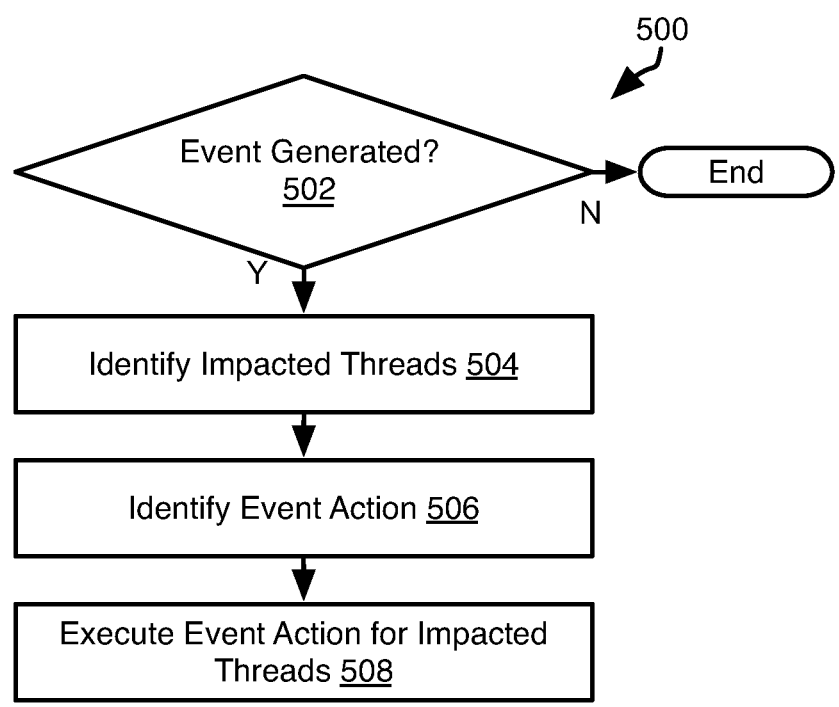
FIG. 5 is a process flow diagram of a method for handling hardware-generated events in accordance with an embodiment of the present invention.

Referring to FIG. 5, the illustrated method 500 may be executed by the processing device 102 or a component coupled to the processing device 102 and programmed to perform thread scheduling functions. The method 500 may include evaluating 502 whether an event has been generated by the HSC 202. If so, then one or more impacted threads may be identified 504. For example, an application may instantiate an HSC state and further register one or more threads of the application with the thread scheduler 206 to receive events from the HSC state. The application may further specify actions to be performed by the thread scheduler 206 in response to events. For example, the application may specify that a thread is to be blocked or branch to a different thread in response to a particular event generated for an HSC state.

Accordingly, identifying 504 threads impacted by an event may include identifying threads registered by an application as corresponding to the HSC state for which the event was generated and/or registered to receive the event type of the event received at step 502. The method 500 than may include identifying 506 an action to be performed in response to the event (e.g. block, unblock, branch, end, etc.). The action to be performed may be specified by the application to the thread scheduler when registering a thread for a particular event of a particular state. Accordingly, the specified action may be retrieved by the thread scheduler at step 506. The specified action may then be executed 508. Accordingly, for each impacted thread, the impacted thread may be blocked, unblocked, branched, ended, or the like according to the action specified.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

The invention claimed is:

1. A method comprising:
providing a memory device storing executable data;
providing a processing device coupled to the memory device and operable to retrieve and execute the executable data;
providing a hardware synchronization component operably coupled to the processing device and including one or more states;
concurrently executing a plurality of threads of execution by the processing device;
issuing, by the plurality of threads of execution, instructions to the hardware synchronization component, the instructions including, for each state of one or more states, multiple instructions addressed to the each state within a same clock cycle;
aggregating, by the hardware synchronization, for each state of the one or more states, the multiple instructions addressed to the each state to obtain an aggregate instruction for the each state;

updating, by the hardware synchronization component, each state of the one or more states according to the aggregate instruction for the each state;

determining, by the hardware synchronization component, that the one or more states of the hardware synchronization component meet a threshold condition;

in response to determining that the one or more states of the hardware synchronization component meet the threshold condition, outputting, by the hardware synchronization component, an event to the processing device;

in response to receiving the event from the hardware synchronization component, altering, by the processing device, execution of at least one thread of the plurality of threads of execution.

2. The method of claim 1, further comprising:
inputting, by the processing device, the event to a thread scheduler; and
causing the altering of the execution of the at least one thread by the thread scheduler in response to the event.

3. The method of claim 1, wherein altering execution of the at least one thread comprises blocking the at least one thread.

4. The method of claim 1, wherein altering execution of the at least one thread comprises instructing the at least one thread to branch.

5. The method of claim 1, wherein updating each state of the one or more states according to the aggregate instruction for the each state comprises incrementing a counter by a number of the multiple instructions addressed to the each state within the same clock cycle.

6. The method of claim 5, wherein determining that the one or more states of the hardware synchronization component meet the threshold condition comprises determining that the counter meets the threshold condition.

7. The method of claim 1, wherein the instructions include first instructions and second instructions;
wherein updating each state of the one or more states of the hardware synchronization component according to the aggregate instruction comprises:
incrementing a first counter by a number of the first instructions; and
incrementing a second counter by the number of the second instructions.

8. The method of claim 7, wherein determining that the one or more states of the hardware synchronization component meet the threshold condition comprises:
inputting a first value of the first counter and a second value of the second counter into a function to obtain a function output; and
determining that the function output meets the threshold condition.

9. The method of claim 8, wherein the function is a difference between the first value and the second value.

10. The method of claim 9, wherein the first instructions are write instructions and the second instructions are read instructions, the read and write instructions referencing a first-in-first-out buffer.

11. A system comprising:
a memory device storing executable data;
a processing device coupled to the memory device and operable to retrieve and execute the executable data;
a hardware synchronization component operably coupled to the processing device and defining one or more states;
wherein the processing device is programmed to—
concurrently execute a plurality of threads of execution by the processing device;
issue instructions to update the one or more states from the plurality of threads to the hardware synchronization component;
wherein the hardware synchronization component is programmed to, for each state of the one or more states—
aggregate, for each cycle of a clock, instructions to update the each state that are received during the each cycle to obtain an aggregate instruction for the each state;
update the each state of the hardware synchronization component according to the aggregate instruction for the each state;
when the one or more states meet a threshold condition, output an event to the processing device;
wherein the processing device is further programmed to alter execution of at least one thread of the plurality of threads of execution in response to the event.

12. The system of claim 11, wherein the processing device is further programmed to:
input the event to a thread scheduler; and
cause altering of the execution of the at least one thread by the thread scheduler in response to the event.

13. The system of claim 11, wherein the processor is programmed to alter execution of the at least one thread by blocking the at least one thread.

14. The system of claim 11, wherein the processor is programmed to alter execution of the at least one thread by instructing the at least one thread to branch.

15. The system of claim 11, wherein the hardware synchronization component is programmed to update each state of the one or more states according to the aggregate instruction for the each state by incrementing a counter corresponding to the each state by a number of the multiple instructions addressed to the each state within the same clock cycle.

16. The system of claim 15, wherein the hardware synchronization component is programmed to determine that the one or more states of the hardware synchronization component meet the threshold condition by determining that the counter meets the threshold condition.

17. The system of claim 11,
wherein the hardware synchronization component is programmed to update the one or more states of the hardware synchronization component by:
incrementing a first counter by a number of first instructions of the instructions received during each cycle of the clock; and
incrementing a second counter by a number of second instructions of the instructions received during each cycle of the clock.

18. The system of claim 17, wherein the hardware synchronization component is programmed to determine that the one or more states of the hardware synchronization component meet the threshold condition by:
inputting a first value of the first counter and a second value of the second counter into a function to obtain a function output; and
determining that the function output meets the threshold condition.

19. The system of claim 18, wherein the function is a difference between the first value and the second value.

20. The system of claim 19, wherein the first instructions are write instructions and the second instructions are read instructions, the read and write instructions referencing a first-in-first-out buffer.

* * * * *